(12) United States Patent
Baron et al.

(10) Patent No.: US 7,756,828 B2
(45) Date of Patent: Jul. 13, 2010

(54) CONFIGURATION MANAGEMENT DATABASE STATE MODEL

(75) Inventors: Anthony Baron, Woodinville, WA (US); Anders Vinberg, Kirkland, WA (US); Andrew Timothy Hopper, Bellevue, WA (US); Ashvinkumar J. Sanghvi, Sammamish, WA (US); Dileep R. P. Kumar, Redmond, WA (US); Giedrius Zizys, Redmond, WA (US); Nigel G. Cain, Redmond, WA (US); Vij Rajarajan, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 515 days.

(21) Appl. No.: 11/276,444

(22) Filed: Feb. 28, 2006

(65) Prior Publication Data

US 2007/0203952 A1  Aug. 30, 2007

(51) Int. Cl.
   *G06F 7/00* (2006.01)
(52) U.S. Cl. ...................... 707/634; 707/659
(58) Field of Classification Search ................. 700/104, 700/100
   See application file for complete search history.

(56) References Cited

U.S. PATENT DOCUMENTS

| 3,358,270 A | * | 12/1967 | Crew et al. ................... 711/200 |
| 3,387,272 A | * | 6/1968 | Florkowski et al. ......... 711/207 |
| 5,619,716 A | * | 4/1997 | Nonaka et al. ............... 717/167 |
| 6,115,715 A | * | 9/2000 | Traversat et al. ............ 707/100 |
| 6,301,587 B1 | * | 10/2001 | Kim et al. ................... 707/104.1 |
| 6,631,387 B2 | * | 10/2003 | Kim et al. ................... 707/205 |
| 6,718,347 B1 | * | 4/2004 | Wilson ....................... 707/201 |
| 6,810,396 B1 | * | 10/2004 | Blumenau et al. .............. 707/5 |
| 2001/0020254 A1 | * | 9/2001 | Blumenau et al. ........... 709/229 |
| 2002/0026537 A1 | * | 2/2002 | Schlabach et al. .............. 710/1 |
| 2002/0060955 A1 | * | 5/2002 | Kumagai ................. 369/30.05 |
| 2002/0169745 A1 | * | 11/2002 | Hotti et al. ..................... 707/1 |
| 2004/0002880 A1 | * | 1/2004 | Jones ........................... 705/7 |
| 2004/0221049 A1 | * | 11/2004 | Blumenau et al. ........... 709/229 |
| 2004/0225630 A1 | * | 11/2004 | Kim et al. ....................... 707/1 |
| 2005/0114829 A1 | * | 5/2005 | Robin et al. ................. 717/101 |
| 2005/0154747 A1 | * | 7/2005 | Kii et al. ..................... 707/101 |
| 2006/0004875 A1 | * | 1/2006 | Baron et al. ................. 707/200 |
| 2006/0064486 A1 | * | 3/2006 | Baron et al. ................. 709/224 |
| 2006/0136585 A1 | * | 6/2006 | Mayfield et al. ............ 709/224 |
| 2006/0161444 A1 | * | 7/2006 | Lubrecht et al. ............... 705/1 |
| 2006/0161879 A1 | * | 7/2006 | Lubrecht et al. ............ 717/101 |
| 2006/0195460 A1 | * | 8/2006 | Nori et al. ................... 707/100 |
| 2006/0200477 A1 | * | 9/2006 | Barrenechea ............... 707/100 |

(Continued)

OTHER PUBLICATIONS

Yi-Jing Lin and Steven P. Reiss; Configuration Management with Logical Structures; Copyright 1996 IEEE.

(Continued)

*Primary Examiner*—John R. Cottingham
*Assistant Examiner*—Mohammed R Uddin

(57) ABSTRACT

A configuration management database for storing configuration information about an IT system. The configuration management database may have representations of configuration items that correspond to configuration items in the IT system, indicia of relations between the configuration items, and attributes of the configuration items. The configuration management database may also have configuration state information of the configuration items, where the configuration state information has information indicating whether a configuration item, relation, or attribute is in a state of pending approval or in a state of planned deployment. The configuration management database may also have temporal information indicating a temporal state of a configuration item, relation, or attribute.

11 Claims, 11 Drawing Sheets

U.S. PATENT DOCUMENTS

2006/0225032 A1* 10/2006 Klerk et al. .................. 717/105
2006/0245369 A1* 11/2006 Schimmelpfeng et al. ... 370/252
2007/0061191 A1*  3/2007 Mehrotra et al. .............. 705/11
2007/0100892 A1*  5/2007 Kephart et al. .............. 707/200
2007/0194957 A1*  8/2007 Watanabe ................... 341/106
2007/0250812 A1* 10/2007 Sanghvi et al. ............. 717/117
2007/0256050 A1* 11/2007 Behnia et al. ............... 717/104
2007/0261018 A1* 11/2007 Sanghvi et al. ............. 717/100

OTHER PUBLICATIONS

Oracle; Oracle Software Configuration Manager; Copyright 2005; www.oracle.com/technology/products/repository/index.html.

Chris Sheedy; Sorceress—A Database Approach to Software Configuration Management; Abstract; Copyright 1991 ACM.

* cited by examiner

140

| | Actual | Planned | Pending Approval |
|---|---|---|---|
| Future ↑ | X | Future State (FS) | Pending Future State (PFS) |
| Present | IS'ness<br>Current State (CS) | OUGHT'ness<br>Desired State (DS) | X |
| Past ↓ | Historical Current State (HCS) | Historical Desired State (HDS) | Historical Pending Rejected State (HPRS) |

| Attribute | Type |
|---|---|
| CI_IsVerified | Bit *(False)* |
| CI_VerifiedTime | datetime (Format: datetime) |
| CI_FromTime | datetime (Format: datetime) |
| CI_ToTime | Datetime (Format: datetime) |
| CI_IsFutureVal | Bit |
| CI_ModifiedTime | datetime (Format: datetime) |

172

| Attribute | Type |
|---|---|
| Name | Format: text, length: 100 |
| Description | Format: text, length: 2000 |
| IsConfigItem | bit |
| CI_IsVerified | bit |
| CI_VerifiedTime | datetime (Format: datetime) |
| CI_IsBusinessCritical | bit |
| CI_FromTime | datetime (Format: datetime) |
| CI_ToTime | datetime (Format: datetime) |
| CI_IsFutureVal | bit |
| FQDN | Format: text, length: 100 |
| Size | Int |
| LastBootupTime | datetime (Format: datetime) |
| ComputerType | Format: text, length: 100 |
| Status | Format: text, length: 100 |

FIG. 4

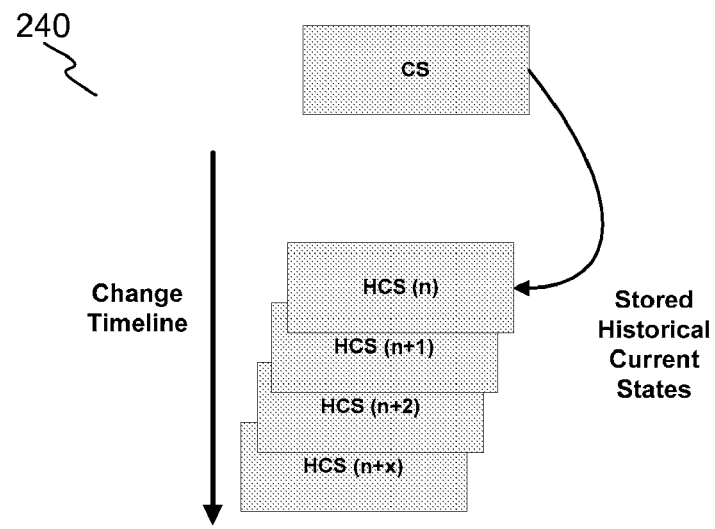
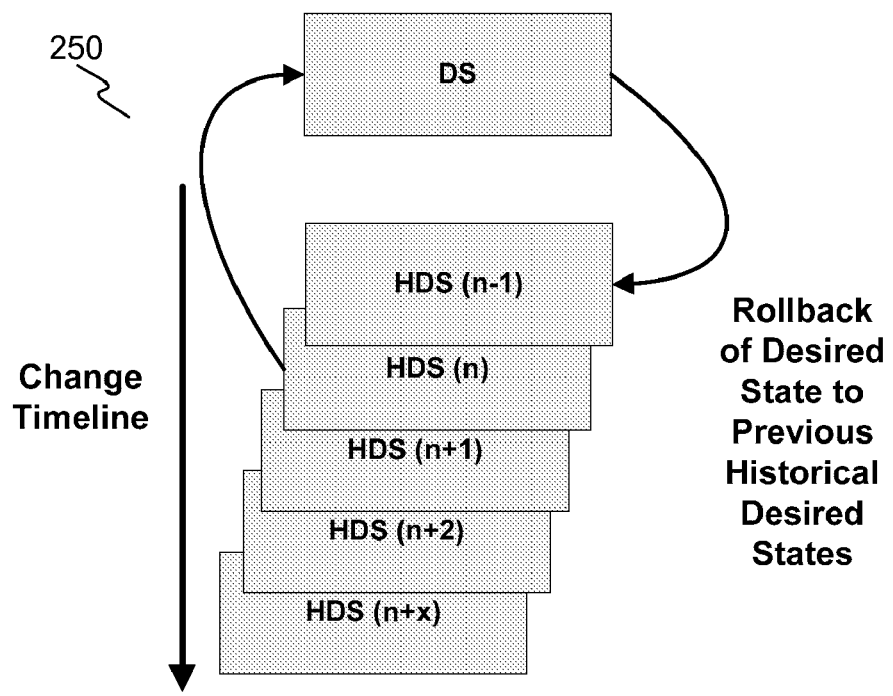
FIG. 11

CONFIGURATION MANAGEMENT DATABASE STATE MODEL

BACKGROUND

How Information Technology (IT) systems are managed can affect IT costs, reliability, and performance. Participants in the field of IT service management aim to produce technology and processes that enable IT systems to be managed in a formal, predictable, and efficient manner.

A common basis for many IT management tools and processes is the IT Infrastructure Library (ITIL), which is a set of guidelines, best practices, and industry standards for managing IT systems. ITIL is roughly analogous to the IBM Redbooks and is independent of any particular technologies.

Some vendors and consulting companies have produced detailed documents and software for realizing and extending ITIL's generic dictates. For example, Microsoft Corporation provides documentation explaining how to implement formal change management for Exchange servers, how to distribute software using System Management Server (SMS), how to monitor a SQL server using Microsoft Operations Manager (MOM), and so on. However, the roles and processes specified by ITIL for IT management are platform and vendor agnostic.

IT systems can be sensitive to change. ITIL provides guidelines for managing change in IT systems. For example, ITIL might proscribe a best practice that if a minor IT change is to be made, it should be managed in one way, but if a major change is to be made (e.g., a network modification) then the change should be managed differently. There might be an advisory change rule that representatives from key departments should be involved in making decisions about a major IT change, whereas a minor change might have an advisory rule that only limited roles should be involved.

ITIL also suggests automation for managing change. In particular, ITIL suggests the use of systems to automate the management of IT changes, for example, to track and deploy changes, to predict the affects of a change, and so on. To this end, ITIL also suggests the use of a Configuration Management Database (CMDB) to centralize much of the information used in managing changes to the configuration of IT systems.

Many IT systems may have a de facto or informal CMDB, in the form of spreadsheets, local databases, paper records, etc. However, complex IT environments call for a formal CMDB to facilitate change and configuration management tools, incident handling tools, and others to allow such tools to operate on a common understanding of the configuration state of an IT system. Details of a CMDB will be discussed below in the Detailed Description.

To date, CMDBs have been designed only to track the current state of the configuration of an IT system. There has been no appreciation of the benefits that might flow from incorporating states and temporal features into a CMDB. Nor have any techniques been developed for including such features in a CMDB.

SUMMARY

The following summary is included only to introduce some concepts discussed in the Detailed Description below. This summary is not comprehensive and is not intended to delineate the scope of protectable subject matter, which is set forth by the claims presented at the end.

A configuration management database (or methods or systems for the same) is provided for storing configuration information about an IT system. The configuration management database may have representations of configuration items that correspond to configuration items in the IT system, indicia of relations between the configuration items, and attributes of the configuration items. The configuration management database may also have configuration state information of the configuration items, where the configuration state information has information indicating whether a configuration item, relation, or attribute is in a state of pending approval or in a state of planned deployment. The configuration management database may also have temporal information indicating a temporal state of a configuration item, relation, or attribute.

Many of the attendant features will be more readily appreciated by referring to the following detailed description considered in connection with the accompanying drawings.

DESCRIPTION OF THE DRAWINGS

Like reference numerals are used to designate like parts in the accompanying Drawings.

FIG. 2 shows a state model for a CMDB.

FIG. 4 shows example fields that can be included in a CMDB to model various states.

FIG. 11 shows stored historical current states and a rollback of a desired state to a previous historical desired state.

DETAILED DESCRIPTION

CMDB Overview

Figure 1:
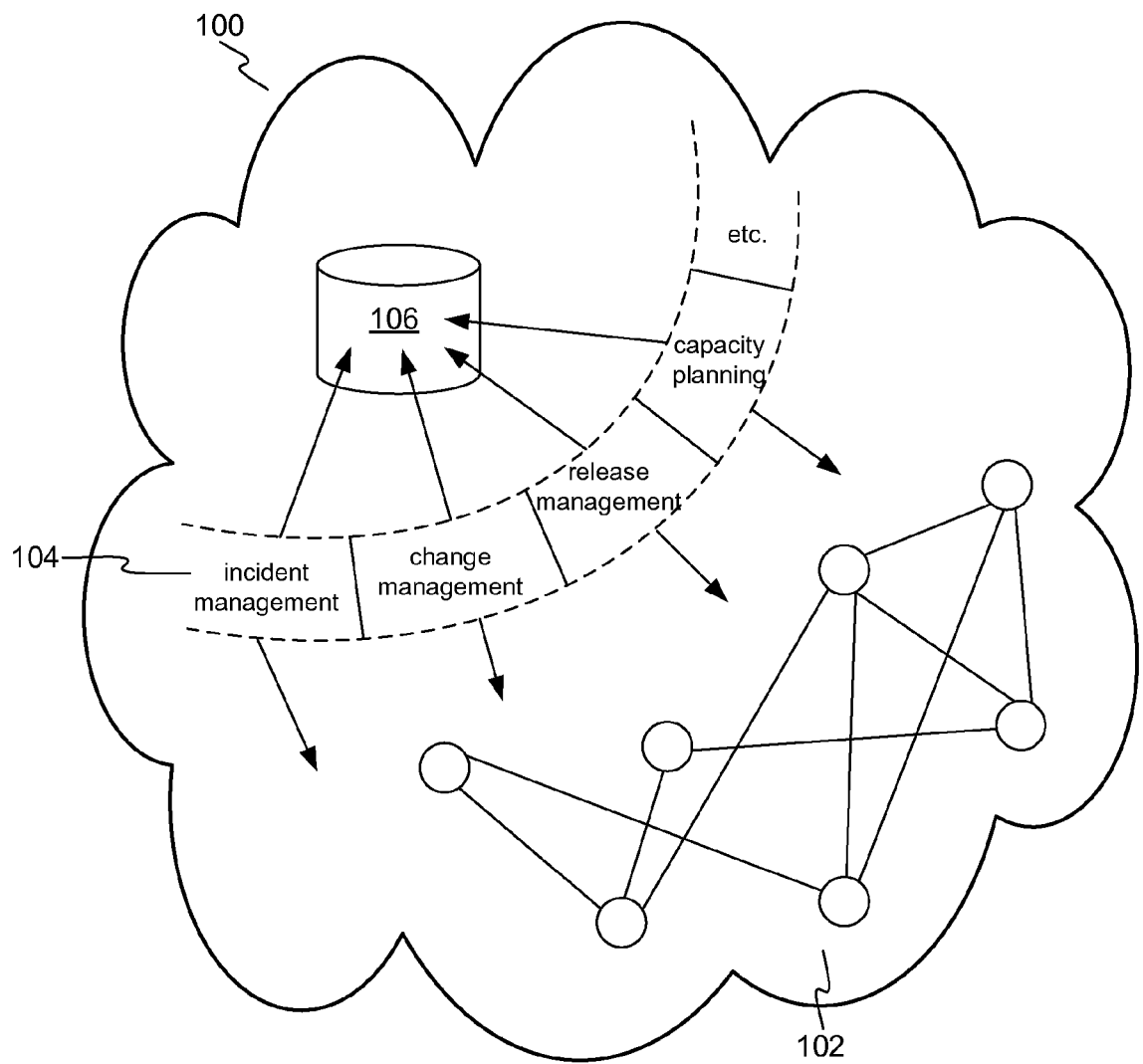
FIG. 1 shows an IT system having artifacts, a management layer, and a CMDB.

FIG. 1 shows an IT system 100 having artifacts 102, a management layer 104, and a CMDB 106. An IT system such as IT system 100 may have many managed components or configuration items (CIs) 102. A CI 102 is an instance of a physical, logical, or conceptual entity (e.g., a service) that is part of the IT system 100. Typical functions of the various management components of management layer 104 shown in FIG. 1 are explained in ITIL and also specific IT management frameworks such as the Microsoft Operations Framework (MOF). For purposes herein, it is sufficient to note that the management components rely on the CMDB 106 as a source of information about the configuration state of an IT system and also may submit change updates to the CMDB 106 that correspond to changes in the IT system 100.

A CI 102 might be a computer system, a role (e.g., database administrator), a managed service, an installed instance of a software application, to name a few examples. A CI instance usually has configurable attributes specific thereto, and a CMDB usually includes description of the configuration state of an IT system that is sufficient to allow each CI to be uniquely identified and managed. For example, a computer CI might have a serial number or an IP address, a person or role might have configurable attributes such as office hours or location, an application might have a version number, and so on. A CI might even be a facility artifact such as a building, an alarm system, and so on. A CI is a working instance of a real part of the IT system 100, as opposed to information about the same. A CMDB may also describe how CIs relate to the managed services.

Put another way, a CMDB stores detailed representations of CIs (also referred to as managed elements) that make up an organization's IT infrastructure, including managed services and elements that compose each of these services. A CMDB should describe in sufficient detail the configuration of each of these elements such that it may be possible to differentiate between two different versions of the same element. Examples of details or attributes stored with the representation of a CI in a CMDB might be: whether a CI is related to some person; who owns a CI; who services a CI; what is a CI's location (e.g., room number, floor number); who has a maintenance agreement on a CI; when does such an agreement expire; what is the configuration of a CI; what software is running on a CI; or what service is a CI using; and so on.

As mentioned above, a CMDB may also describe dependencies, prerequisites and links between elements or CIs, thus allowing the derivation of CIs composed of other CIs. A CMDB may also describe various services that an IT system delivers and also the inventory and composition of managed elements relevant to each of these services. A CMDB may also be used for non-configuration purposes, for example, a CMDB may serve as a catalog of managed services (a service catalog or inventory of CIs).

Although ITIL may be consulted for high level guidance about how a CMDB should be used and what generally should be stored within it, ITIL does not proscribe details about how a CMDB should be structured or how CIs (or their relations or attributes) should be represented in a CMDB. Various CMDB embodiments discussed below may be used to facilitate the managing of configuration state of service-managed parts (CIs) of an IT infrastructure. More particularly, following is a description of how a CMDB may be configured to allow identification and manipulation of various configuration states that a CI may be in (e.g., requested, approved, pending, etc.) and/or how a CMDB can track temporal aspects of a CI, such as whether a CI is a past, present or future configuration state.

A CMDB is generally physical-store agnostic and may be implemented in any of a variety of types of artifact stores. That is, depending on where the store is implemented, the actual store could be based in memory, or in an XML file, or in a relational database, or in an object database, etc. An artifact store ideal for the CMDB may have the following characteristics. It should be object oriented. The store is preferably (but not necessarily) a metadata based extensible store where new solution implementations can bring in more CI types and relationships with the addition of appropriate corresponding metadata. The store should allow the definition of classes, properties, relationship types, and compositions (composite CIs). The classes and relationships should be capable of being specialized by subclassing and adding properties or further constraints. Subclasses should inherit all attributes and behavior of the parent class. The physical or artifact store should also be connected such that artifacts in the store can be associated with artifacts in other stores accessible via a webservice and addressable via a URI. Alternatively, various stores may have components for federating with other stores to provide a distributed or federated CMDB. A federated CMDB may require a CMDB communication layer to bridge possibly different object models of different stores or to handle differences between different types of stores. Furthermore, CIs might require globally unique identifiers wherever they reside within a federated CMDB. In any case, it should be noted that CMDB enhancements discussed herein can be readily applied to an autonomous CMDB or to a federated CMDB; the state model approach does not care about the location of state, i.e. it can be in a centralized store or a federated store, the state model approach need only know is where it is located.

CMDB State Model

FIG. 2 shows a state model 140 for a CMDB. The state model 140 defines different state types that an instance of a CI, or relation, or attribute can transition though throughout its lifecycle. The state model 140 describes past, present and future states that are possible for each CI instance covering both actual, planned, and approved configuration states ("actual" meaning the real state, and "planned" meaning what is should be or should have been). For ease of discussion, state will be discussed with reference to CIs, however, it should be understood that any such discussion is equally applicable to any relations or attributes stored in a CMDB.

In one embodiment, the data store used for the CMDB is a relational database. The database can be provided with a data access overlay defined by metadata. Such an overlay can be defined using the System Definition Model (SDM) meta model. This approach allows query operations such as filtering, aggregating, joining, grouping-by, sorting-by, etc. An example of metadata for enabling the state model 140 is discussed later with reference to FIG. 4. In accordance with the state model 140, a version of a CI instance will not exist in every state type but rather will proceed through a given path depending on whether the CI is successful in gaining approval, whether it is successfully deployed, and so on. The possible paths of a CI are discussed with reference to FIGS. 6-14. It should be noted that the state model 140 is applicable to CMDBs in general, regardless of whether they have a data access layer, regardless of the nature of the data store storing the CMDB, and regardless of the data model of the IT infrastructure whose configuration is being stored by the CMDB. The general idea of using the state model 140 for CIs in a CMDB can be realized in many ways.

The state model 140 is largely self-explanatory. However, the possible states of a CI may be thought of as the product of crossing a time dimension with a configuration state dimension. The transition path that a CI will take through the state model 140 will depend on management events and decisions that affect the CI. It should also be noted that not all states in the state model 140 are necessary. For example, it is possible to remove the time dimension and have a state model having only various configuration states. The state model 140 is preferably managed by IT management services that access the CMDB, such as a change management service, a release a management service, or others. For example, if a change management service is to add a new representation of a CI instance to the CMDB, it would likely specify that the CI representation has a state of "future, pending approval". Details of how states change are discussed later.

Figure 3:
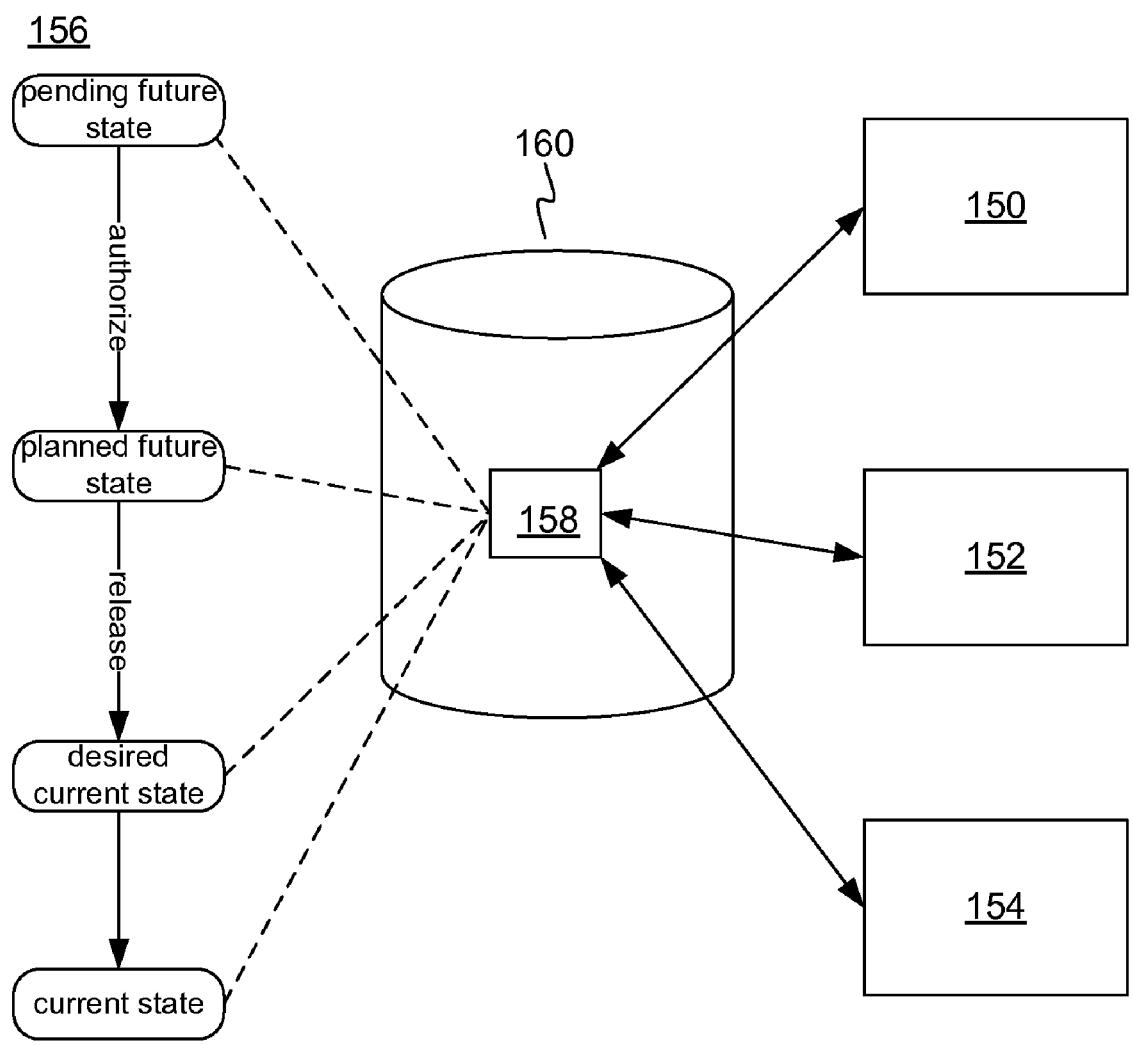
FIG. 3 shows different management services arranged to manage state changes of a CI representation in a CMDB.

FIG. 3 shows different management services 150, 152, 154 arranged to manage state changes 156 of a CI representation 158 in a CMDB 160. A change management service 150 might create CI representation 158 with a state of "pending, future". The change management service 150 might change the state to "planned, future". A release management service 152 might release the new CI (e.g., a new software package) and at the same time change the CI's representation 158 to "desired, current". Another management service 154 might obtain the CI's actual state and compare it to the configuration indicated in the CI's representation 158, and, if they are congruent, the service 154 might change the state of the CI representation 158 to "current".

FIG. 4 shows example fields 170 that can be included in a CMDB to model various states. To represent different states, the fields 170 can be added to any CMDB tables which model CIs, attributes, and relationships within the CMDB. The fields 170 could have any arbitrary labels, but what they represent is as follows. The CI_IsVerified field indicates that the "desired state" matches what exists in the production environment. The CI_VerifiedTime field indicates when this verification occurred. The CI_FromTime field indicates when this state is effective. The CI_ToTime field is when the state is to expire. The CI_IsFutureValue state indicates whether this state is new/pending deployment. The CI_Modified state indicates the date/time at which the state was changed. FIG. 4 also shows an example of a CI model 172 with fields 170 added thereto. The example model CI 172 is an example of the structure of a database table that could be used to represent computer CIs that include the metadata fields 170 capable of being used to capture state.

Flow Through CMDB State Model

Figure 5:
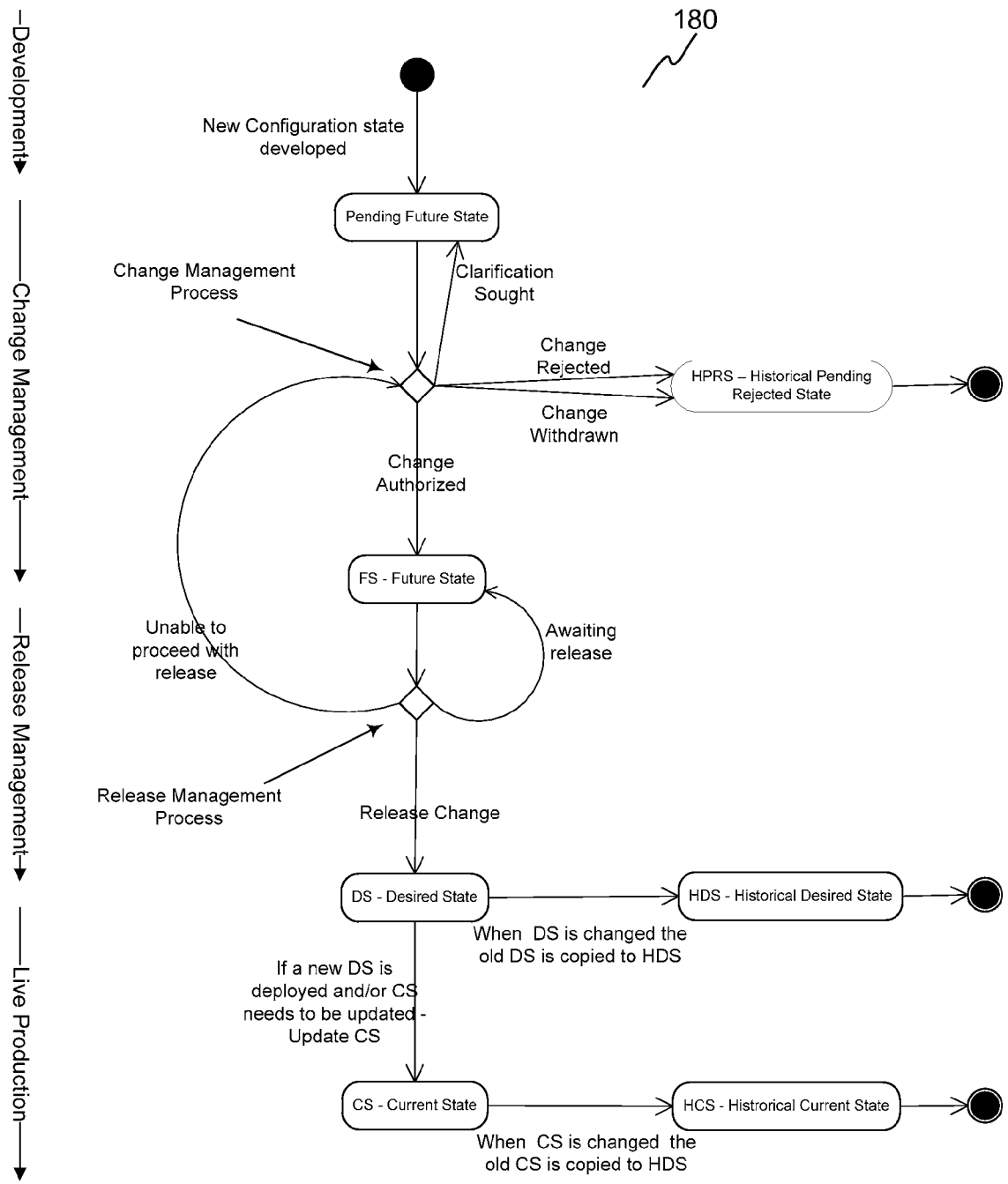
FIG. 5 shows a process of how CMDB elements can flow through the state model.

FIG. 5 shows a process 180 of how CMDB elements can flow through the state model 140. The main states involved are "current state" (CS), "desired state" (DS), the "future state", the "pending future state" (PFS), the "historical pending rejected state" (HPRS), the "historical current state" (HCS), and the "historical desired state" (HDS). These states will be discussed in turn below Current State (CS)

Current state is the state that a CI possesses in present time. Generally, the most accurate description of CS is that stored on the CI itself (as opposed to the CI's representation in the CMDB). In the example of a computer, the CS would be the state of the configuration on that computer. Some IT management systems will take an inventory of a system (perhaps once daily or once weekly, depending on the rate of change in the environment) and store that within a database (operational store). With the exception of a highly locked down configuration there will be some drift from the configuration on the CI to that held in the operational store. An operational store tends to be used for either problem identification when the CI is un-contactable or for targeting operational tasks such as patching. Local verification should still be performed on the CI to ensure that there has not been a drift in configuration sufficient to invalidate the task.

In the case of a server configuration, for example, the CS is held on the hard drive of the server and in the registry. A snap shot of the CS is also captured by a management component when an inventory is completed and this snapshot is used for targeting of software distribution and maintenance tasks. In a somewhat static environment such as a corporate data center a weekly inventory will have minimal drift from the actual CS. In a highly dynamic environment, more frequent inventories may be needed to keep the configuration drift within a tolerable level.

In one embodiment, the CMDB CS will take the raw inventory information (measured configuration information) and parse this according to the SDM schema (object model) to get an SDM-based representation of the CS. Later comparison between the CS and the DS is relatively straightforward because both are SDM data. Preferably, the CMDB CS will also point to the raw operational data in the operational store (or whatever store holds this snapshot of CS) so the CMDB CS has access to more comprehensive data than the data that is held within the model.

Desired State (DS)

Figure 6:
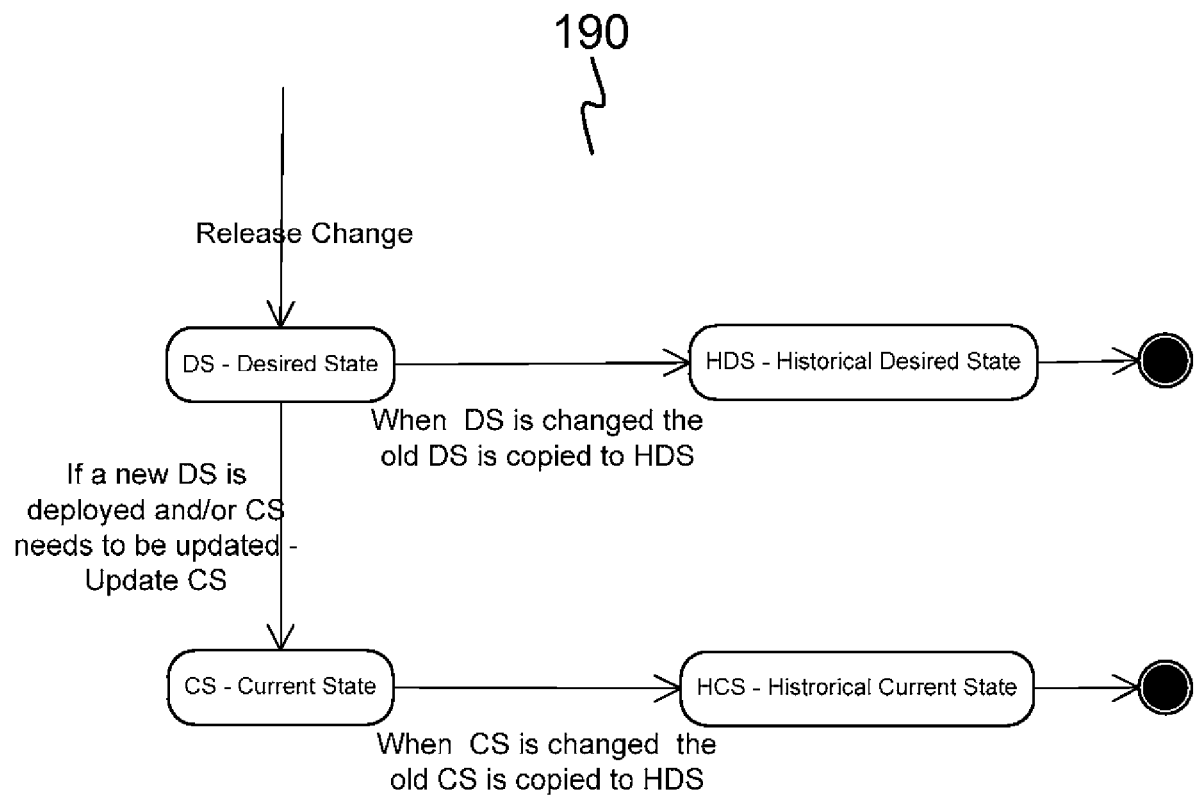
FIG. 6 shows state flow related to desired state (DS).

FIG. 6 shows state flow 190 related to desired state (DS). Desired state is the state a CI should be configured to so that the CI can be described as being correctly configured. Desired state will typically describe settings that can be evaluated to test the CI's compliance with a desired configuration or baseline. It is possible however, that some organizations will want to have a more deterministic configuration and this will result in more or possibly most of the configuration settings being set in the DS. This type of configuration could useful be in safety-critical systems, for example, in aeronautical systems or nuclear control systems.

When a system is initially installed it should be fully be compliant with its DS configuration and it can be described as having its CS conforming to its DS (CS≡DS). The level of system lockdown and the dynamic nature of changes within the IT environment will determine the rate of drift from the DS. Only one current DS should exist for a CI at any point in time; other DSs are either future DSs or past DSs, as seen in FIG. 6.

Further regarding drift, a management policy may be implemented to determine how often the drift away from CS will be evaluated. This may be time based such as in the case of desired configuration monitoring (DCM, a function of some IT configuration management systems), where a job will run periodically to identify and report non-compliance of CI CS from DS. This information can then be used to facilitate remedial action to bring the CI CS back into compliance or back to CS≡DS. The use of SDM can increase the practicality of real-time evaluation of compliance to ensure minimal drift between CS and DS.

Future State (FS)

Figure 7:
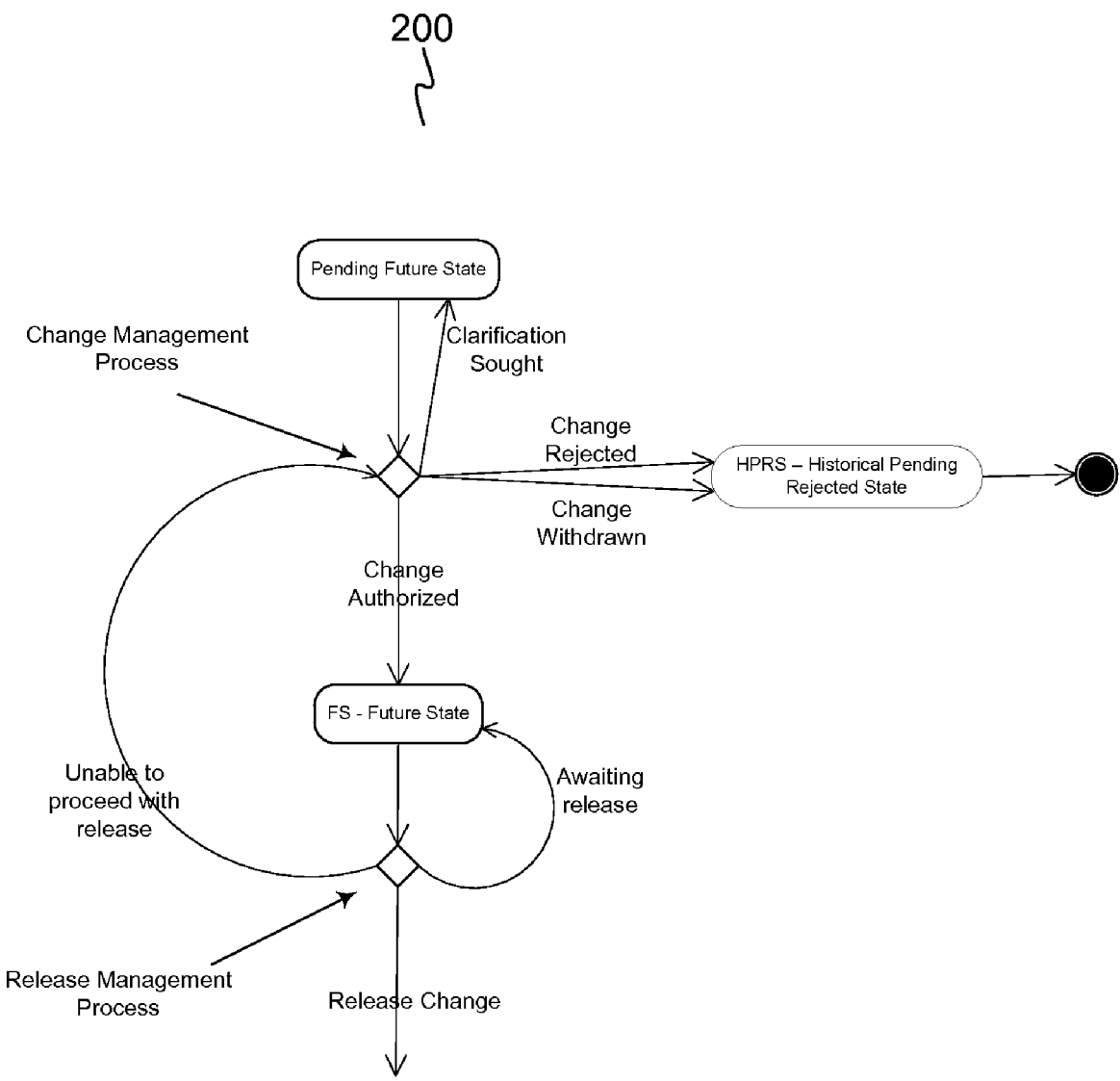
FIG. 7 shows state flow related to future state (FS).

FIG. 7 shows state flow 200 related to future state (FS). Future state is the DS configuration that a CI will need to have to meet at a defined point in the future. Multiple versions of a FS can exist but only a single FS can be deployed at an instant in time. Future state holds the same information that is held by DS can be said to equal DS at the point of release, in which case FS≡DS. The fact that a version of FS is defined $FS_n$ does not guarantee that it will be released to DS, since it can be superseded by another version of future state—$FS_{n+1}$—that is released ahead of $FS_n$.

Figure 8:
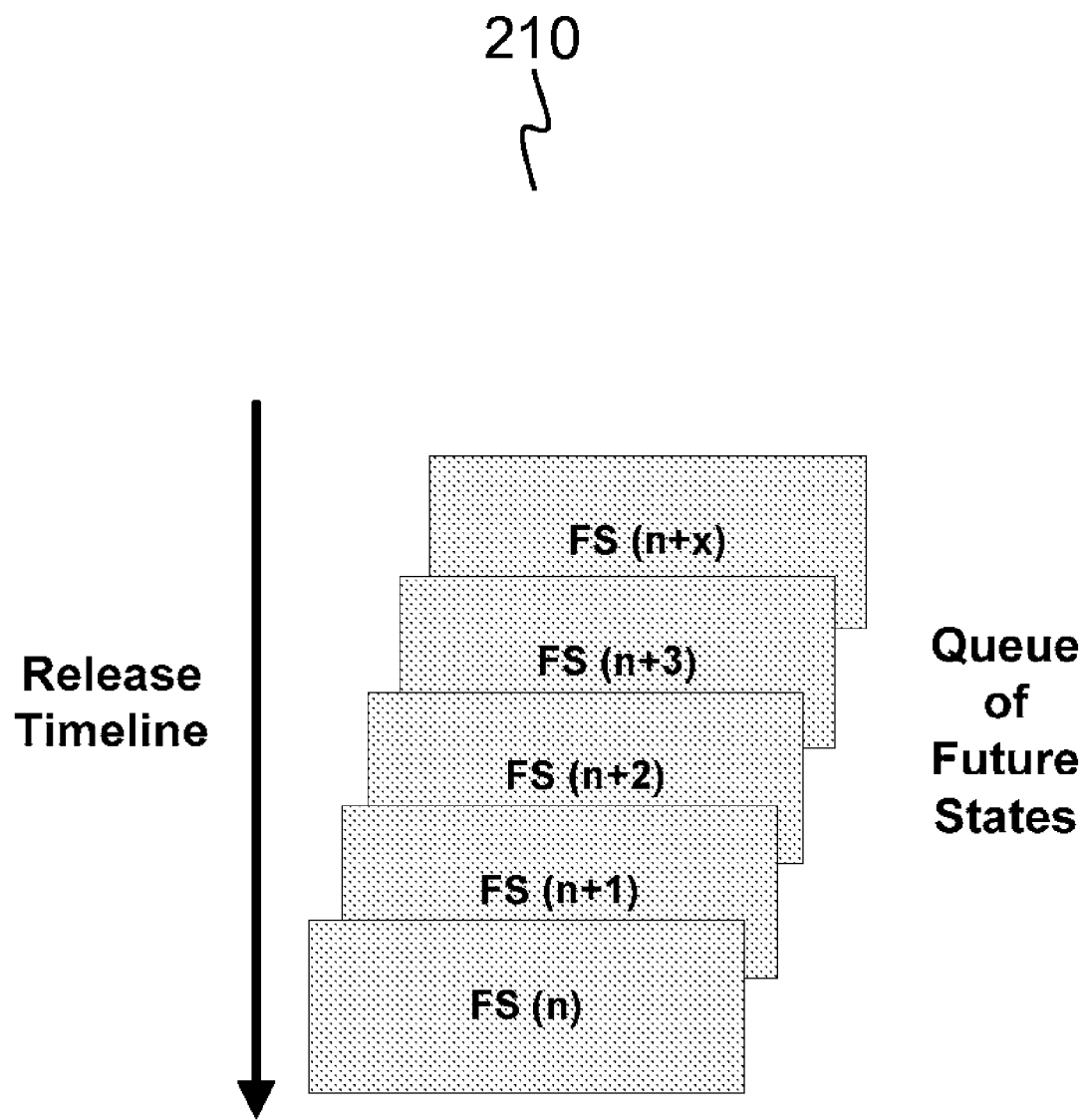
FIG. 8 shows a queue of future state configurations.

FIG. 8 shows a queue of future state configurations 210. Future state can be considered to be a queue of configurations that are sorted into configurations based on their release order. Future state stops being FS when it exits the queue 210 either by being released to DS, by being removed or deleted, or by having its approval rescinded, in which case the state would revert to its pending future state (PFS), as shown in FIG. 7.

Pending Future State (PFS)

Figure 9:
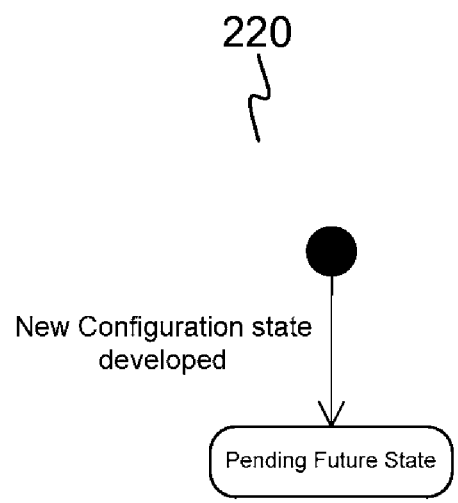
FIG. 9 shows a flow of a new configuration state entering a pending future state.

FIG. 9 shows a flow 220 of a new configuration state entering a pending future state. Pending Future State (PFS) is the state that is created following the completion of developing a new configuration state. Pending future state enters the change management process by, for example, submitting a request for change (RFC). Pending future state preferably contains the same configuration information that is defined in FS and DS above.

Figure 10:
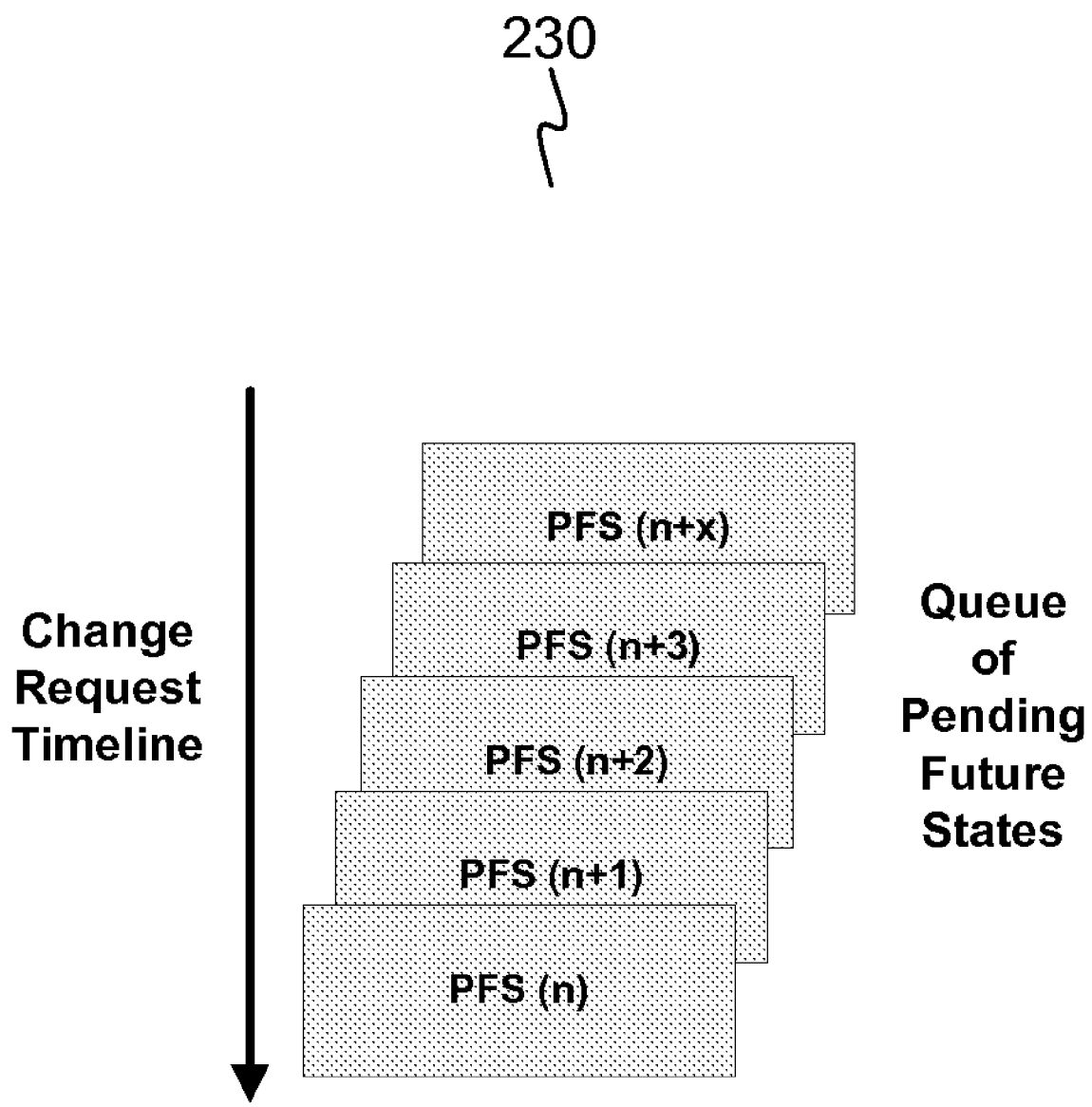
FIG. 10 shows a queue of future pending states.

FIG. 10 shows a queue of future pending states 230. Similar to FS, PFS can be considered to be a queue of configurations that are sorted into configurations based on their change request timeline, which is priority and date driven. Pending future state need not deal with release conflicts; once it is change-approved (e.g., by a change management service) it becomes FS where it is subject to release management.

Historical Pending Rejected State (HPRS)

Historical pending rejected state (HPRS) contains PFS & FS state configurations that that have not been deployed. Withdrawn changes, rejected changes, changes that cannot be released, or failed configurations are stored in HPRS. Historical pending rejected state contains not only the state information but also includes a reference to the corresponding RFC so that the basis of the rejection can be identified, whether it is technical or procedural.

Historical Current State (HCS)

FIG. 11 shows stored historical current states 240 and a rollback 250 of a desired state to a previous historical desired state. Historical Current State (HCS) is a state that a CS instance contained prior to a last change that was applied to it. Multiple versions of HCS exist as a new copy is created with every subsequent change to CS. Historical current state is normally created from the CI instance itself but can also be created from an operational store, although such an instance of the HCS may not contain as accurate a description of the state, depending on how fresh the operational store is. From the numerous versions of HCS that exist it is possible to assemble a chronological view of the configuration states of any CI instance.

As shown in FIG. 11, HCS can be used to rollback state changes in the event that a problem occurs with the current CS. In this case, the existing CS (DS?) would be moved to $HCS_{n-1}$ and the previous $HCS_n$ would be restored while leaving a copy in the stored historical current states 240.

Conclusion

In conclusion, those skilled in the art will realize that storage devices used to store program instructions can be distributed across a network. For example a remote computer may store an example of a process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art, all or a portion of the software instructions may be carried out by a dedicated circuit, such as a DSP, programmable logic array, or the like.

All of the embodiments and features discussed above can be realized in the form of information stored in volatile or non-volatile computer or device readable medium. This is deemed to include at least media such as CD-ROM, magnetic media, flash ROM, etc., storing machine executable instructions (either prior to execution, during execution, or both), or source code, or any other information that can be used to enable or configure computing devices to perform the various embodiments discussed above. This is also deemed to include at least volatile memory such as RAM storing information such as CPU instructions during execution of a program carrying out an embodiment.

The invention claimed is:

1. One or more computer readable volatile or nonvolatile computer readable media storing a configuration management database (CMDB) for storing configuration information about an Information Technology (IT) system, the configuration management database comprising:

configuration items that correspond to and represent actual configuration items in the Information Technology (IT) system, indicia of relations between the configuration items, and attributes of the configuration items;

configuration states of the configuration items, the configuration states comprising:

approval-pending future states of configuration items, which indicate that respective configuration items have changes for which approval has been requested and the changes have not yet been approved or rejected;

historical approval-pending past states of configuration items, which correspond to or comprise rejected approval-pending future states of the configuration items;

approved-planned future states of configuration items, which correspond to or comprise approval-pending future states that have been approved for deployment;

desired current states of configuration items, which correspond to or comprise approved-planned future states that have been implemented by releases to the Information Technology (IT) system, and which indicate states that corresponding configuration items should currently have;

historical desired states of configuration items, the historical desired states corresponding to or comprising previous desired current states that are no longer in effect and have been superseded by more recent desired current states;

actual current states of configuration items, the actual current states comprising states of the configuration items derived from automated inventorying various of the actual configuration items that correspond to and are represented by the configuration items having the actual current states, the actual current states comprising new desired current states wherein a given configuration item concurrently has both an actual current state and desired current state concurrently and mutually reflecting different state of the given configuration item; and historical actual states of configuration items, the historical actual states of configuration items comprising or corresponding to previous actual current states of the configuration items that have been superseded by more recent actual current states.

2. One or more computer readable media according to claim 1, wherein the configuration states are stored in a field in the configuration management database.

3. One or more computer readable media according to claim 1, wherein the configuration states are in the form of one or more queues for storing configuration items, relations, or attributes, with different queues corresponding to different configuration states.

4. One or more computer readable media according to claim 1, wherein the configuration states further comprise information indicating whether a configuration item, relation, or attribute is in an actual current state.

5. One or more computer readable media according to claim 1, wherein the configuration items, relations, and attributes are instances are stored in accordance with an object model describing the IT system.

6. One or more computer readable media according to claim 5, wherein the configuration management database further comprises system definition model (SDM) metadata describing the object model.

7. A method of maintaining state information for a configuration management database (CMDB) for storing configuration information about an Information Technology (IT) system, the method comprising:

storing configuration items that correspond to and represent actual configuration items of which the Information Technology (IT) system is comprised, actual configuration items including at least computers and/or components thereof, computing services, and applications, wherein a given single configuration item in the CMDB at any given time has multiple corresponding states representing different states of the same given configuration item;

in response to receiving new configuration states of the configuration items of the Information Technology (IT) system, setting them to an approval-pending future state;

in response to approvals of the approval-pending future states, transitioning the approved approval-pending future states to approved-planned future states of the configuration items of the configuration items, and in response to rejections of the approval-pending future states, transition the rejected approval-pending future states to a history of rejected approval-pending future states;

transitioning corresponding approved-planned future states of configuration items to new desired current states, the new desired current states reflecting configuration state that the configuration items should have after releases to the Information Technology (IT) system that configure actual items represented by the configuration items; and maintaining current states of configuration items, the current states representing current configuration state of the configuration items, and updating the current states of the configuration items to correspond to new desired current states for the configuration items and updating the current states with inventory information collected from the actual configuration items represented by the configuration items, where prior current states are stored in a history of current states when they are superseded by new current states.

8. A method according to claim 7, further comprising communicating between a plurality of data stores that together form the configuration management database, which comprises a federated configuration management database.

9. A method according to claim 8, wherein state transitions are managed by one or more management services including at least a change management service for managing change in the IT system.

10. A system of one or more cooperating devices configured for maintaining a configuration management database for storing configuration information about an Information Technology (IT) system, the system comprising:

a storage storing representations of configuration items that correspond to configuration items of which the Information Technology (IT) system is comprised, configuration items including at least computers and/or components thereof, computing services, and applications;

a logic unit that responds to receiving new configuration states of the configuration items of the Information Technology (IT) system by setting them to an approval-pending future state, which indicates that approval is pending for the new configuration states, and saves a history of rejected and/or withdrawn new configuration states;

responds to approvals of the approval-pending future states by transitioning the approval-pending future states to pending future states of the configuration items of the configuration items, the pending future states indicating that the new configuration states have been approved but have not been deployed;

responds to release of updates corresponding to the pending future states to the Information Technology (IT) system by: transitioning the pending future states to new desired/intended states of the configuration items which replace previous desired/intended states, replacing old current states with new current states that match the new desired/intended states, and saving the old desired/intended states and the old current states.

11. A system configured according to claim 10, wherein the logic unit copies the current state to a historical current state before it is updated or added as the transitioned new desired/intended state.

* * * * *